(12) United States Patent
Kebreau

(10) Patent No.: US 9,492,021 B2
(45) Date of Patent: Nov. 15, 2016

(54) HANGAR FOR HAIR WEAVE EXTENSIONS

(71) Applicant: Cindy Kebreau, Brooklyn, NY (US)

(72) Inventor: Cindy Kebreau, Brooklyn, NY (US)

( * ) Notice: Subject to any disclaimer, the term of this patent is extended or adjusted under 35 U.S.C. 154(b) by 0 days.

(21) Appl. No.: 14/298,886

(22) Filed: Jun. 7, 2014

(65) Prior Publication Data

US 2015/0351562 A1 Dec. 10, 2015

(51) Int. Cl.
*A47F 7/06* (2006.01)
*F16B 47/00* (2006.01)
*A47G 25/14* (2006.01)

(52) U.S. Cl.
CPC ............. *A47F 7/065* (2013.01); *A47G 25/14* (2013.01); *F16B 47/00* (2013.01)

(58) Field of Classification Search
CPC .............. A47G 25/18; A47G 25/183; A47G 25/186; A47G 25/48; A47G 25/482; A47G 25/483; A47G 25/485; A47G 25/488; A47G 25/50; A47G 25/481; A47G 25/14; F16B 47/00; A47F 7/065
USPC ........................... 223/85, 88, 90, 91; 132/105
See application file for complete search history.

(56) References Cited

U.S. PATENT DOCUMENTS

| | | | | |
|---|---|---|---|---|
| 1,421,709 A | * | 7/1922 | Nelson | 211/119 |
| 1,602,957 A | * | 10/1926 | Weigel | 132/314 |
| 1,915,293 A | * | 6/1933 | Covey | 452/193 |
| 2,593,356 A | * | 4/1952 | Smith | 211/119 |
| 3,352,430 A | * | 11/1967 | McAtee | 211/119 |
| D253,448 S | * | 11/1979 | Salladay | D6/319 |
| D279,627 S | * | 7/1985 | Morin | D6/319 |
| 5,029,739 A | * | 7/1991 | Blanchard et al. | 223/88 |
| D334,292 S | * | 3/1993 | Klein et al. | D6/317 |
| 6,041,985 A | * | 3/2000 | Balser | 223/91 |
| 6,095,346 A | * | 8/2000 | Idelberger | 211/85.2 |
| D433,821 S | * | 11/2000 | Brutus et al. | D6/317 |
| 6,152,313 A | * | 11/2000 | Klein et al. | 211/113 |
| 7,182,232 B2 | * | 2/2007 | Fleming et al. | 223/88 |
| 7,445,544 B2 | * | 11/2008 | Niemiec | 452/193 |
| 7,793,808 B1 | * | 9/2010 | Herman et al. | 223/88 |
| D688,472 S | * | 8/2013 | Cohen | D6/319 |
| 2006/0260634 A1 | * | 11/2006 | Henricksen et al. | 132/275 |
| 2013/0104922 A1 | * | 5/2013 | Hall et al. | 132/200 |

FOREIGN PATENT DOCUMENTS

GB 2505513 A * 3/2014

* cited by examiner

*Primary Examiner* — Patrick Hawn
(74) *Attorney, Agent, or Firm* — Ash Tankha; Lipton, Weinberger & Husick

(57) ABSTRACT

The invention provides a storage apparatus, configured expressly for storing hair extensions comprising a free standing hanger, divided into sections to accommodate hanging the hair extensions placed on either one to three rows of hanging arms, with each arm featuring a series of spring loaded clip fasteners, on which the individual hair extensions may be hung, wherein one or more of these hanging arms feature heavy duty suction cups for use in securing.

4 Claims, 2 Drawing Sheets

HANGAR FOR HAIR WEAVE EXTENSIONS

RELATED APPLICATIONS

This application claims benefit of priority to U.S. Provisional Patent Application No. 61/916,648 entitled "HANGAR FOR HAIR WEAVE EXTENSIONS" filed Dec. 16, 2013,

TECHNICAL FIELD

The present invention relates to the storage of hair extensions. More specifically, the present invention relates to devices which include a plurality of garment hangars carried by a single hook member or the like.

BACKGROUND ART

Most women generally within their lifetime will buy hair weave extensions, but eventually have no place to store them and usually end up putting them in plastic bags and placing them in a clothing drawer, causing the hair to tangle, and shed. On average, African American women spend $2000 or more annually on this type of hair extension product with nowhere to store their hair. Therefore, there is a need for an apparatus which allows women to hang their purchased hair extensions allowing them to design their hair in any style they want without the clutter associated with storing a variety and quantity of different hair extensions.

The prior art has put forth several designs for hanger devices with a plurality of hangers. Among these are: U.S. Pat. No. 4,058,222 to Evelyn R. Singer describes a multiple clothes hanging device embodying a vertically supported elongate track member and a plurality of hanger slides, each carrying a garment hanger, slidably mounted on the track member, U.S. Pat. No. 2,601,926 to Mannie H. Speaker and Sidney Nash describes a multiple garment hanger comprising a frame of a hanger comprising a tube of suitable material drawn into a configuration of removable racks detachably secured to said frame and a swinging rack pivotally secured to the hanger frame and U.S. Pat. No. 2,593,356 to Clyde V. Smith describes a multiple garment rack comprising garment supporting arms inclined with respect to the connecting frame.

None of these prior art references describe the present invention.

SUMMARY OF THE INVENTION

The invention provides a storage apparatus, configured expressly for storing hair extensions comprising a free standing hanger, divided into sections to accommodate hanging the hair extensions placed on either one to three rows of hanging arms, with each arm featuring a series of spring loaded clip fasteners, on which the individual hair extensions may be hung, wherein one or more of these hanging arms feature heavy duty suction cups for use in securing.

It is an object of the present invention to provide a hanger device with a plurality of hangers suitable for hanging hair extensions.

DESCRIPTION OF EMBODIMENTS

Figure 1:
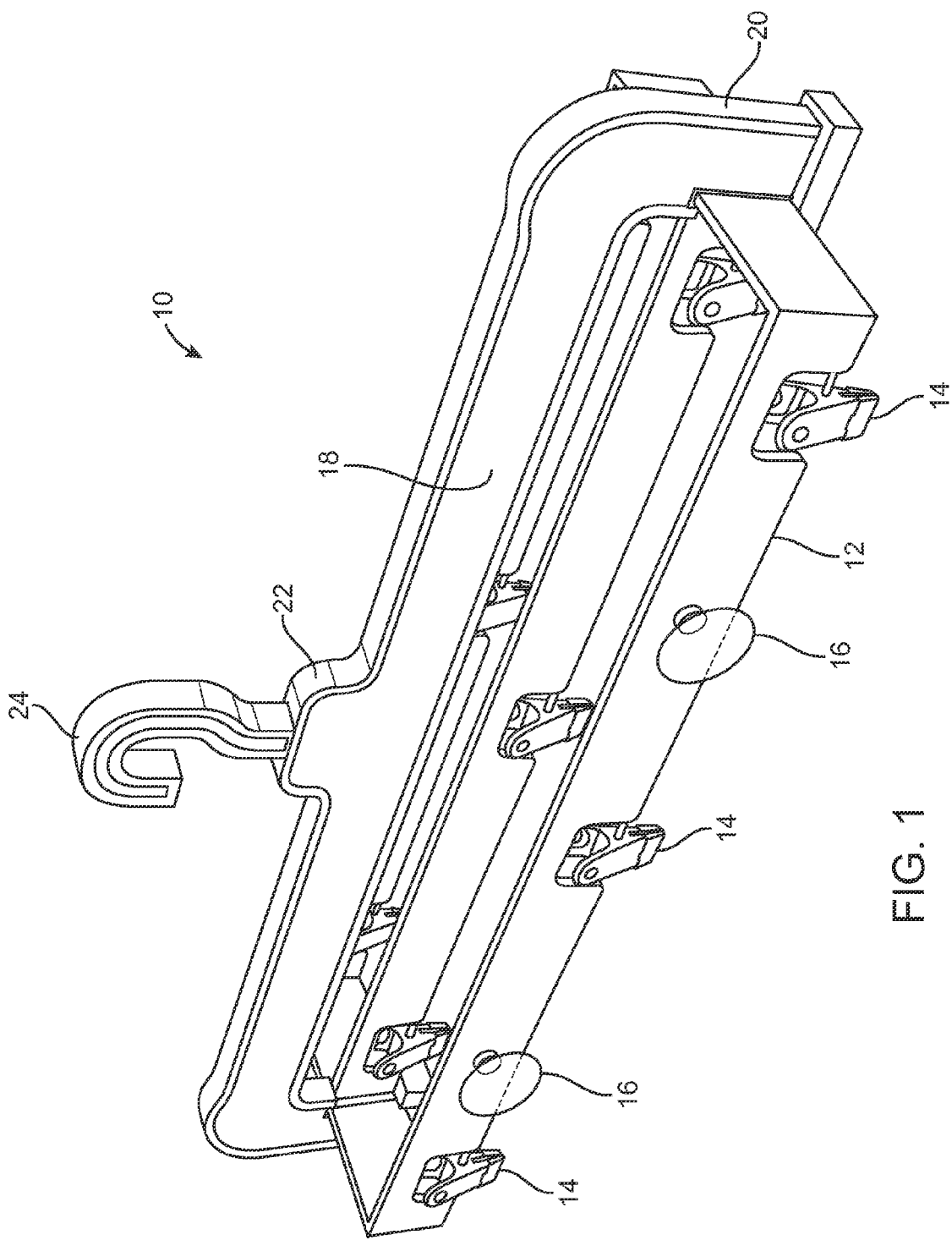
FIG. 1 is a perspective view of the hangar for storing hair extensions in accordance with the present invention.

WM Referring now to FIG. 1, the present invention hereinafter referred as the "Hair Extension Hanger", is a specially designed storage unit, configured expressly for storing hair extensions. Manufactured primarily of sturdy plastic and in another embodiment, sleek aluminum material, The Hair Extension Hanger is comprised of a free standing hanger, divided into sections or three hangar arms to accommodate the hanging attachment of hair extensions. This product is used at home and in professional hair salons. At home the user removes the hair extensions from their head, and places them in order using the different hangar arms for removal of their hair extensions to be washed and air-dried. Once the hair dries, the user brings the device with the hair extensions attached to a professional hair dresser's salon and has them re-attach the extensions in their proper order.

The hair salon professional also uses this device to remove, wash and re-apply hair extensions in the proper order as well. The Hair Extension Hanger has a plurality of parallel bars or rods that are equally spaced across and are secured or attached at their respective ends to two sides thereby forming a rectangular frame. The two sides of the frame together with the bar or rods supports hair extensions by use of spring loaded clip fasteners. Turning now to FIG. 1, there is shown one preferred embodiment of Hair Extension Hangar having three bars or rods wherein each bar or rod supports three clip fasteners. Additionally, one or more of these hanging arms feature heavy duty suction cups for use in securing the Hair Extension Hangar to a wall or use the single hook member placed across a cross bar as used in conventional prior art hangars.

Figure 2:
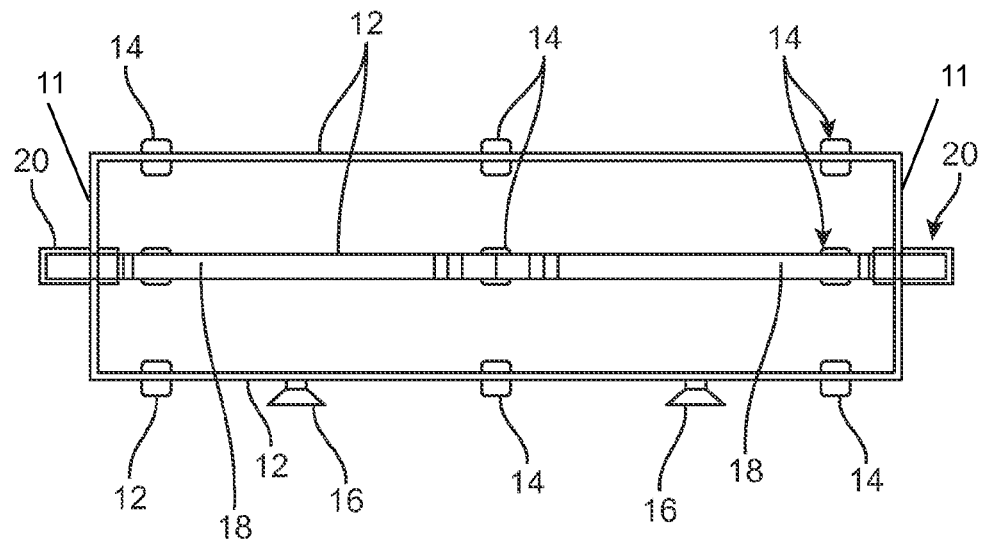
FIG. 2 is a top view of the hangar shown in FIG. 1.
Figure 3:
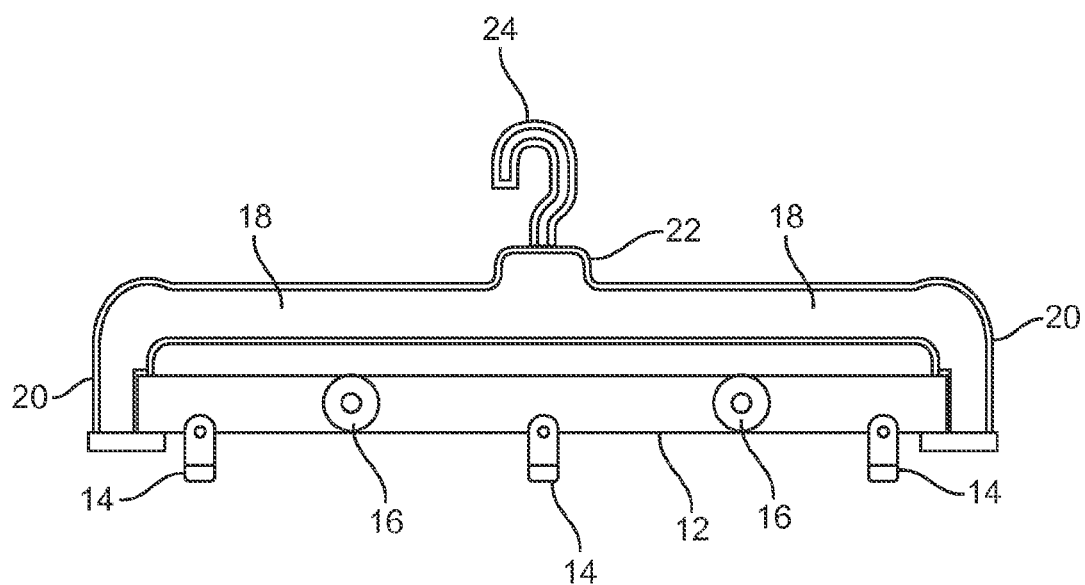
FIG. 3 is a front view of the hangar shown in FIG. 1.

Referring now to FIGS. 2 and 3 a more detailed description of the Hair Extension Hangar will now be provided. As shown in the figures, three elongated straight parallel support members 12 having first and distal ends are attached an integrally formed to each other by a plurality of elongated straight parallel side support members 11. The support members 12 may be either square or circular in cross section. An inverted U-shaped hangar member 18 integrally connected at each of its ends 20 to one of these elongated straight parallel side support members 12.

Additionally, the U-shaped hangar member 18 defines a centrally located swivel 22 hook 24. Turning once again to FIGS. 2 and 3, one of the three parallel support members 12 has attachment members 16 in the form of a heavy duty suction cup. Lastly there are in one example of a preferred embodiment three spring loaded clip fasteners 14 on each support member 12 in which individual hair extensions may be hung. It should be understood, that there may be any combination of support members, fasteners and suction cups used to define the present invention.

Use of the Hair Extension Hanger is very simple and straight forward. First, the user mounts The Hair Extension Hanger to their workstation via the heavy duty suction cups located either side of the unit or the single center located hook member. Once secured in place, The Hair Extension Hanger is ready for use. Prior to applying extensions to the hair, the user loads the extensions, whether removed from the client's own hair or newly purchased, onto the Hair Extension Hanger securing them in place via the spring loaded clips and placing their hair extensions according to whether they go on the left, right or center of the scalp. The user also makes sure to position the extensions across the bar or rods of the hanger in an ascending manner, left, right, center in the proper order of removal. Thus, when applying the extensions, the professional stylist easily removes one extension at a time, and places them in order of removal back to the client's hair.

The Hair Extension Hanger is an innovative product invention which offers hairstylists and their customers a number of significant benefits and advantages. Providing a simple and organized means of storing and accessing hair extensions, The Hair Extension Hanger offers salon professionals a practical means of protecting the integrity of these delicate pieces, while also maintaining a neat and orderly work space. Preventing the extensions from becoming tangled or disheveled, this unique storage tool also saves time, as professionals do not have to sort through tangled extensions in order to style their client's hair. Most importantly, because the Hair Extension Hanger is divided into sections which accommodate the right, left and center of the scalp, users easily store the extensions in order of removal. As such, the customers are spared the tedious and time consuming task of attempting to discern exactly where a particular extension is placed, enabling the professional to apply the extensions in a quick and expert manner. Salon customers also appreciate the Hair Extension Hanger as this product spares them the hassle of holding their extensions while their hair is done, thus enabling them to relax with a good book or magazine and enjoy a pampering experience.

The Hair Extension Hanger is a practical product invention which provides professional stylists and their customers or an individual, neat and organized storage for hair extensions. Simple to use and durably constructed, this handy tool proves an invaluable commodity at home and in any salon.

What is claimed is:

1. A hair weave hanger for storing hair weaves, comprising:
    an inverted U-shaped hanger member disposed along a vertical axis, wherein said U-shaped hanger member comprises a centrally located swivel hook;
    a rectangular frame member disposed along a horizontal axis, wherein said rectangular frame member is perpendicular to said inverted U-shaped hanger member, and wherein said rectangular frame member and said inverted U-shaped hanger member are integrated with each other;
    said rectangular frame member further comprising:
        a pair of side support members, wherein said side support members are parallel to each other, and wherein said side support members form two opposite sides of said rectangular frame member; and
        a set of three parallel support members, wherein each of said set of three parallel support members are disposed along said horizontal axis, wherein said three parallel support members are parallel to each other and perpendicular to said pair of side support members, wherein a first of said set of three parallel support members is fixedly connected between a first end of each of said pair of side support members, wherein a second of said set of three parallel support members is fixedly connected between a second end of each of said pair of side support members, wherein said first and said second of said parallel support members form remaining two sides of said rectangular frame member, and wherein a third of said set of three parallel support members is fixedly connected between a center of each of said pair of side support members;
    one or more attachment members attached to at least one of said parallel support members; and
    a set of three spring loaded clip fasteners connected to each of said parallel support members, wherein said spring loaded clip fasteners are equally spaced apart along a length of said parallel support members.

2. The hair weave hanger of claim 1, wherein said attachment members comprise suction cups.

3. The hair weave hanger of claim 1, wherein each of said parallel support members is generally square in cross section.

4. The hair weave hanger of claim 1, wherein each of said parallel support members is generally cylindrical in cross section.

* * * * *